US009413700B1

(12) United States Patent
Jerrard-Dunne et al.

(10) Patent No.: US 9,413,700 B1
(45) Date of Patent: Aug. 9, 2016

(54) OPERATING A GROUP CHAT SESSION

(71) Applicant: International Business Machines Corporation, Armonk, NY (US)

(72) Inventors: Stanley K. Jerrard-Dunne, Dublin (IE); Andrew T. Penrose, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/964,104

(22) Filed: Dec. 9, 2015

(51) Int. Cl.
H04L 12/58 (2006.01)
H04L 29/08 (2006.01)

(52) U.S. Cl.
CPC ............ *H04L 51/04* (2013.01); *H04L 67/1044* (2013.01)

(58) Field of Classification Search
None
See application file for complete search history.

(56) References Cited

U.S. PATENT DOCUMENTS

| 7,092,952 B1* | 8/2006 | Wilens .................... G06Q 30/02 |
| 7,882,194 B2 | 2/2011 | Lingafelt et al. |
| 8,396,461 B2 | 3/2013 | Soderstrom et al. |
| 9,031,598 B2 | 5/2015 | Pai et al. |
| 2003/0185232 A1* | 10/2003 | Moore .................. G06Q 20/085 370/465 |
| 2006/0031290 A1* | 2/2006 | Mannaru ................ G06Q 10/10 709/204 |
| 2008/0071868 A1 | 3/2008 | Arenburg et al. |
| 2012/0185291 A1 | 7/2012 | Ramaswamy et al. |
| 2013/0165171 A1 | 6/2013 | Pai et al. |
| 2014/0040404 A1* | 2/2014 | Pujare .................... H04L 51/04 709/206 |

FOREIGN PATENT DOCUMENTS

| CN | 103701682 A | 4/2014 |
| WO | 2007052950 A1 | 5/2007 |

OTHER PUBLICATIONS

"Entering general IM settings for the Cisco WebEx connect client." URL:https://support.webex.com/webex/v1.2/common_docs/en_US/orgadmin/index.htm#cs_user_IM_set.htm. Downloaded Nov. 16, 2015. 1 pp.
Gmail will automatically invite some contacts. URL:https://support.google.com/chat/answer/29795?hl=en. Downloaded Jan. 9, 2015. 2 pp.

* cited by examiner

*Primary Examiner* — Angela Nguyen
(74) *Attorney, Agent, or Firm* — Mollborn Patents, Inc.; Fredrik Mollborn

(57) ABSTRACT

A first chat controller receives a request to create a group chat session, and creates the session, including determining a first local chat ID for the session. The first chat controller sends the first local chat ID to the server. The server assigns a common chat ID to the session. A second chat controller determines a second local chat ID for the group chat session associated with the second chat controller. The server receives the second local chat ID, receives a request from the second chat controller to control the session, and assigns control of the session to the second chat controller. The server receives a request from a second user to join the group chat session, sends the request to the second chat controller using the second local chat ID. The second chat controller sends an invitation to the second user to join the session.

14 Claims, 6 Drawing Sheets

OPERATING A GROUP CHAT SESSION

BACKGROUND

The present invention relates to operating a group chat session.

SUMMARY

In accordance with a first aspect of the invention there is provided a computer-implemented method of operating a group chat session using a server. A first user sends a request to a first chat controller to create a group chat session. The first chat controller creates a group chat session, which includes determining a first local chat ID for the group chat session associated with the first chat controller. The first chat controller sends the first local chat ID to the server. The server assigns a common chat ID to the group chat session. A second chat controller determines a second local chat ID for the group chat session associated with the second chat controller. The server receives the second local chat ID for the group chat session associated with the second chat controller. The server receives a request from the second chat controller to control the group chat session. The server assigns control of the group chat session to the second chat controller. The server receives a request from a second user to join the group chat session. The server sends the request to the second chat controller using the second local chat ID. The second chat controller sends an invitation to the second user to join the group chat session.

In accordance with a second aspect of the invention there is provided a computer system for operating a group chat session. The computer system includes a server, a first computing device, and a second computing device. The first computing device includes an instant messaging application with a first chat controller. The second computing device includes an instant messaging application with a second chat controller. The first chat controller is arranged, in response to a first user sending a request, to create a group chat session including determining a first local chat ID for the group chat session associated with the first chat controller, and to send the first local chat ID to the server. The second chat controller is arranged to determine a second local chat ID for the group chat session associated with the second chat controller, to send a request for control of the group chat session to the server, and in response to a request from the server to invite a second user to the group chat session, to send an invitation to the second user to join the group chat session. The server is arranged to assign a common chat ID to the group chat session, to assign control of the group chat session to the second chat controller in response to the request for control, and in response to a request from the second user to join the group chat session, to send the request to invite the second user to the group chat session to the second chat controller.

In accordance with a third aspect of the invention there is provided a computer program product for operating a group chat session using a server, the computer program product comprising a computer-readable storage medium having computer-readable program code embodied therewith, the computer-readable program code configured to perform the computer implemented method described above.

It will of course be appreciated that features described in relation to one aspect of the present invention may be incorporated into other aspects of the present invention. For example, the method of the invention may incorporate any of the features described with reference to the computer system of the invention and vice versa.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

It is common for IT support services to be provided to end users with computer issues using instant messaging (IM)-type communication. In addition, IM communication may be used as part of a support connection allowing additional functionality. For example, in support may be provided to end users by support users in a central support centre. A support user can initiate a special support IM group chat session, which gives the support user control over the end user's machine, allowing the support user to undertake analysis, configuration and/or maintenance of the end user's machine.

To provide a support group chat session to allow a support user control over an end user's machine, a new group chat session can be initiated, or may already be in existence, for example because multiple support users have been discussing a computer issue being experienced by an end user. The group chat session is then configured by the support user to be a support group chat session (i.e. a group chat session which enables the support user to control the end user's machine to provide support), and when the support user and end user both participate in the support group chat session, this allows the support user the required control of the end user's machine.

However, this requires the end user to request an invitation to the support group chat session, and the moderator of the support group chat session to send the invitation to the end user. The moderator of the support group chat session may or may not be the support user with which the end user has been communicating.

It will be appreciated that the above-mentioned IM systems are merely exemplary, and that similar issues can arise with IM-type communication systems that are not used in a support environment, where a user wishes to be invited to an already-existing group chat session.

Figure 1:
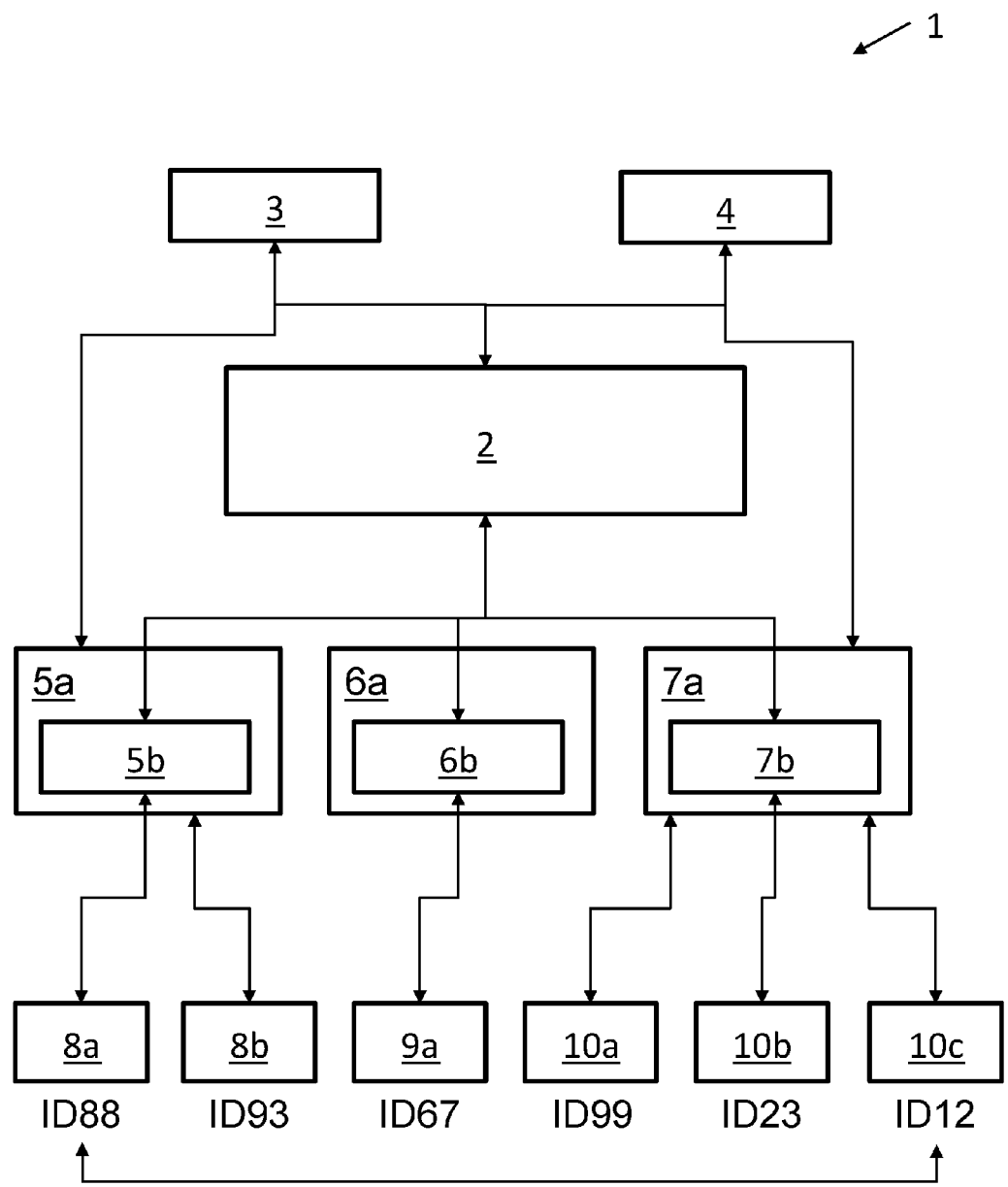
FIG. 1 is a schematic diagram showing a computer system in accordance with an embodiment of the invention.

FIG. 1 shows a computer system in accordance with an embodiment of the invention. The computer system 1 comprises a support server 2, which is a server system that users can use to set up and manage group chat sessions. A support user 3 and end user 4 are able to communicate with the support server 2, for example using a web browser on their machines which communicates with a web interface provided by the support server 2. The operation of the support server 2 is described below.

The support server 2 is further in communication with IM applications 5a, 6a and 7a. The IM application 5a is present on the machine of the support user 3, i.e. it is the IM application used by the support user 3. Similarly, the IM application 7a is present on the machine of the end user 4, i.e. it is the IM application used by the end user 4. The IM applications 5a, 6a and 7a comprise respective controllers 5b, 6b and 7b, which are plugins to the IM applications which operate as described below. In alternative embodiments, the controllers may be separate applications to the IM applications, or provided in any other suitable way.

The IM application 5a has group chat sessions 8a and 8b associated it. The IM application 5a has local chat IDs associated with the group chat sessions 8a and 8b, which are ID88 and ID93 respectively. The group chat session 8a (only) is in communication with the controller 5b.

In a similar fashion, the IM application 6a has associated with it a group chat session 9a with local chat ID ID67, which is in communication with the controller 6b; and the IM application 7a has associated with it group chat sessions 10a, 10b and 10c with respective local chat IDs ID99, ID23 and ID12, with the group chat session 10b (only) being in communication with the controller 7b.

The group chat sessions 8a and 10c are associated with each other; in other words, while they have different local chat IDs, they correspond to a single group chat session using which the support user 3 and end user 4 can communicate by sending instant messages to each other.

Figure 2A:
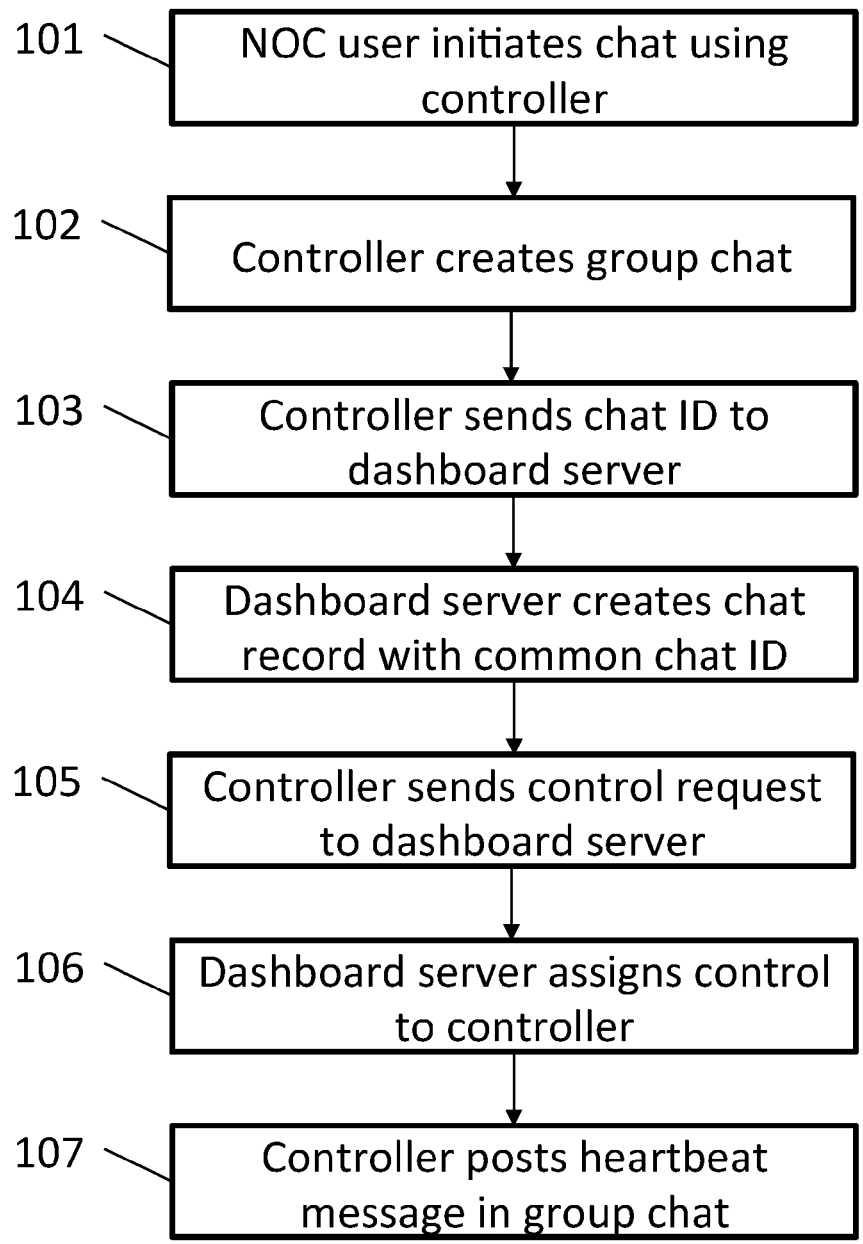
FIGS. 2a to 2d are flowcharts showing the operation of the computer system of FIG. 1.

The operation of the computer system 1 when the support user 3 creates a support group chat session is now described with reference to the flowchart of FIG. 2a. In a first step, the support user 3 instructs the controller 5b of the IM application 5a to initiate a support group chat session (step 101). The controller 5b creates a new group chat session using the IM application 5a (step 102). The IM application 5a generates a local chat ID and assigns it to the group chat session. In the present example the generated local chat ID is ID88, and so the newly created group chat session is the group chat session 8a which is in communication with the controller 5b.

It will be appreciated that in other examples, the group chat session 8a could already exist, and instead of instructing the controller 5b to create a new support group chat session which is then created, the support user 3 could instruct the controller 5b that the existing group chat session 8a should become a support group chat session.

Next, the controller 5b sends the local chat ID to the support server 2 (step 103). The support server 2 then creates a chat record for the group chat session, generates a common chat ID, in this example ID20, and stores it in the chat record (step 104).

The controller 5b then sends a control request to the support server 2 (step 105), and the support server 2 assigns control of the group chat session to the controller 5b (step 106). In an alternative embodiment of the invention, the support server 2 assigns control of the group chat session to the controller 5b without it first sending a control request, but rather in response to it being the controller 5b that caused the chat record for the group chat session to be created.

The controller 5b then posts a heartbeat message in the group chat session (step 107), which includes the common chat ID ID20. The heartbeat message for example may be of the form:

@Heartbeat, id=ID20, v=B1.0, started=2015-01-01 02:22:02 GMT

However, it will be appreciated that any other suitable form could be used.

Thus, in the example in which an existing group chat session is used, the group chat session may contain the following text:

Andrew: There is a problem
Stanley: Where?
Admin: @Heartbeat, id=ID20, v=B1.0, started=2015-01-01 02:22:02 GMT
George: A customer is reporting an issue.

where Andrew, Stanley and George are support users, one being support user 3, and Admin is the controller 5b.

Figure 2B:
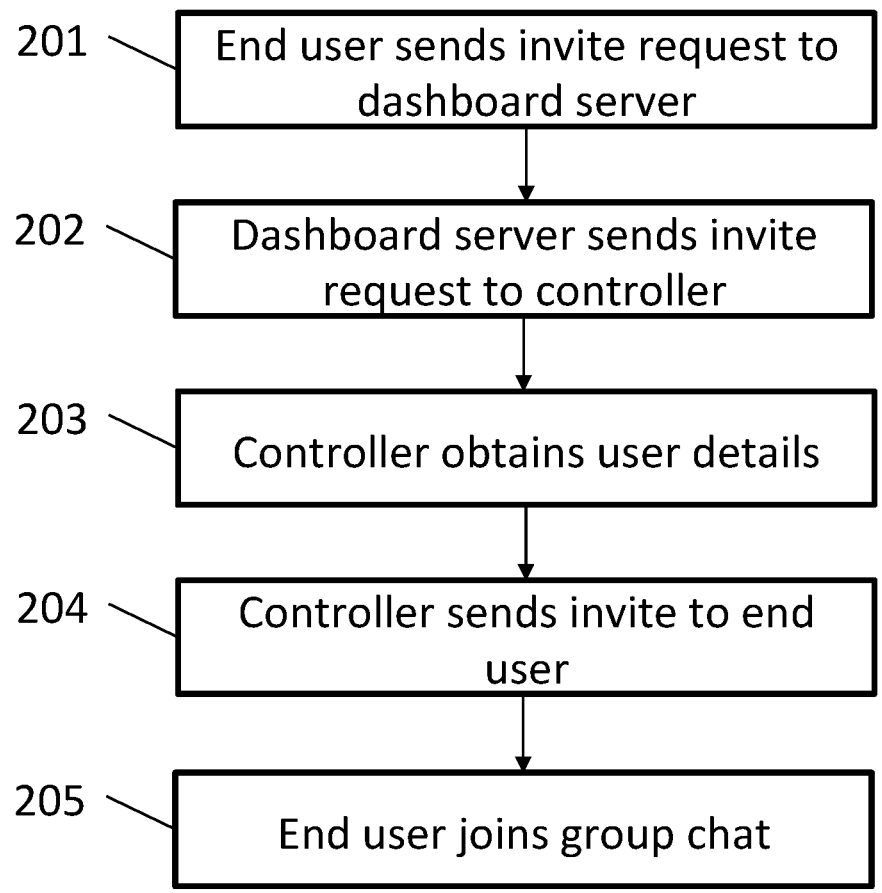

The operation of the computer system 1 when the end user 4 joins the support group chat session is now described with reference to the flowchart of FIG. 2b. First, the end user 4 sends an invite request to the support server 2 (step 201), via the web interface of the support server 2. For example, the end user 4 is able to select the group chat session from chat records stored on the support server 2, i.e. from a list of available support group chat sessions. To allow the end user 4 to identify the correct group chat session, the list may indicate the identity of the support user who initiated each support group chat session, and/or information supplied by the support user when initiating the group chat session as a support group chat session, and/or the common chat ID for the group chat session which the support user 3 separately sends to the end user 4, and/or the end user 4 may only see group chat sessions that the support user who initiated each support group chat session indicated were for the end user 4, for example.

The support server 2 thus knows the common chat ID of the group chat session the end user 4 wishes to join. The support server 2 then sends a corresponding invite request to the controller that has control of the group chat session (step 202), including details of the end user 4. In the current example, this will be the controller 5b. However, as discussed below the controller that has control of the group chat session can change over time.

The controller 5b then obtains further details of the end user 4 that allow it to communication with the end user 4, for example the e-mail of the end user 4 from an LDAP service.

The controller 5b then sends an invitation to the end user 4, in particular the controller 7b of the IM application 7a of the end user 4 (step 204). The end user 4 then joins the group chat session (step 205), thus creating a group chat session with a local chat ID. In the present example, the group chat session of the end user 4 is the group chat session 10c with local chat ID ID12, which as described above provides IM communication between the support user 3 and end user 4. Further, the IM communication is a support group chat session of which the support user 3 has control, allowing it to provide IT support as discussed above. In this way, the end user 4 is able to "auto-invite" themselves to the support group chat session, without the support user 3 having to be manually invite them, as the invitation is handled automatically by the support server 2 and controller 5b.

Figure 2C:
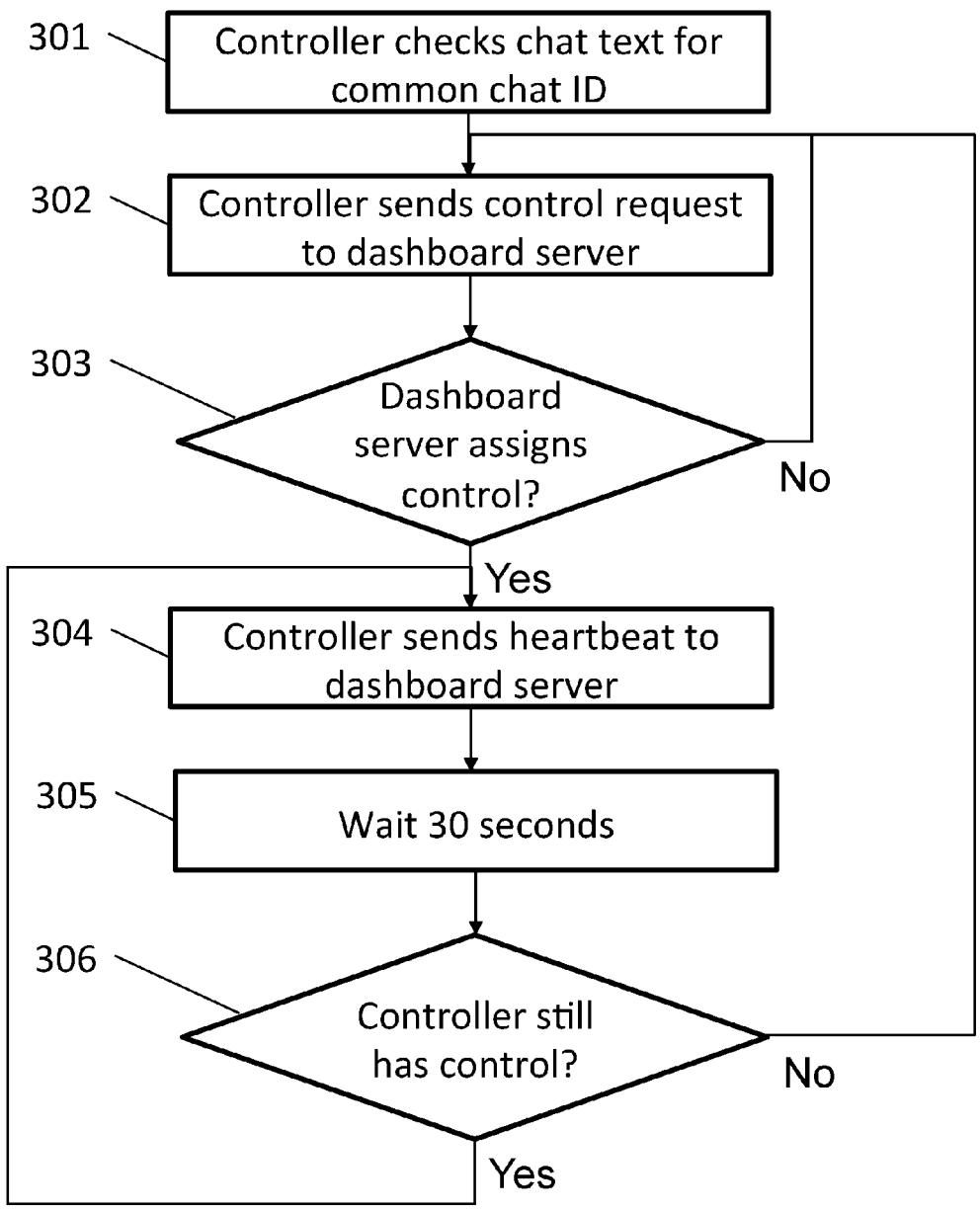

The operation of controllers of support users of the computer system 1 when joined to the support group chat session is now described with reference to the flowchart of FIG. 2c. A controller may be the controller 5b of the support user 3, but it will be appreciated that there may be multiple controllers of multiple support users joined to the support group chat session. However, at any one time only one will have control of the support group chat session. In the present example, the controller is a controller that does not initially have control of the group chat session, but it will be appreciated that later steps of the operation apply equally to the controller 5b which initially has control.

First, when the controller does not have control, the controller checks the text of the group chat session for any heartbeat text containing the common chat ID (step 301). When the controller identifies the common chat ID from heartbeat text, it sends a control request to the support server 2 (step 302). If the support server 2 does not assign control to the controller (step 303), after a period of time the controller tries again (step 302 again).

However, if the support server 2 does assign control to the controller (including the case that the controller is the controller 5b with initial control of the group chat session), the controller sends a heartbeat message to the support server 2 (step 304). The heartbeat message indicates that the controller is still operational, and as above also allows other controller to discover the common chat ID of the group chat session. The controller then waits 30 seconds (step 305). If the controller still has control of the group chat session (step 306), i.e. if the support server 2 has not removed control from the controller as can happen as described below, the controller repeats sending a heartbeat message to the support server 2 at 30 second intervals (step 304 and subsequent steps). It will be appreciated that in alternative embodiments, periods other than 30 seconds could be used, for example 10 seconds, 1 minute or any other appropriate period.

If, on the other hand, the controller no longer has control of the group chat session, it returns to requesting control of the group chat session (step 302 and subsequent steps).

Figure 2D:
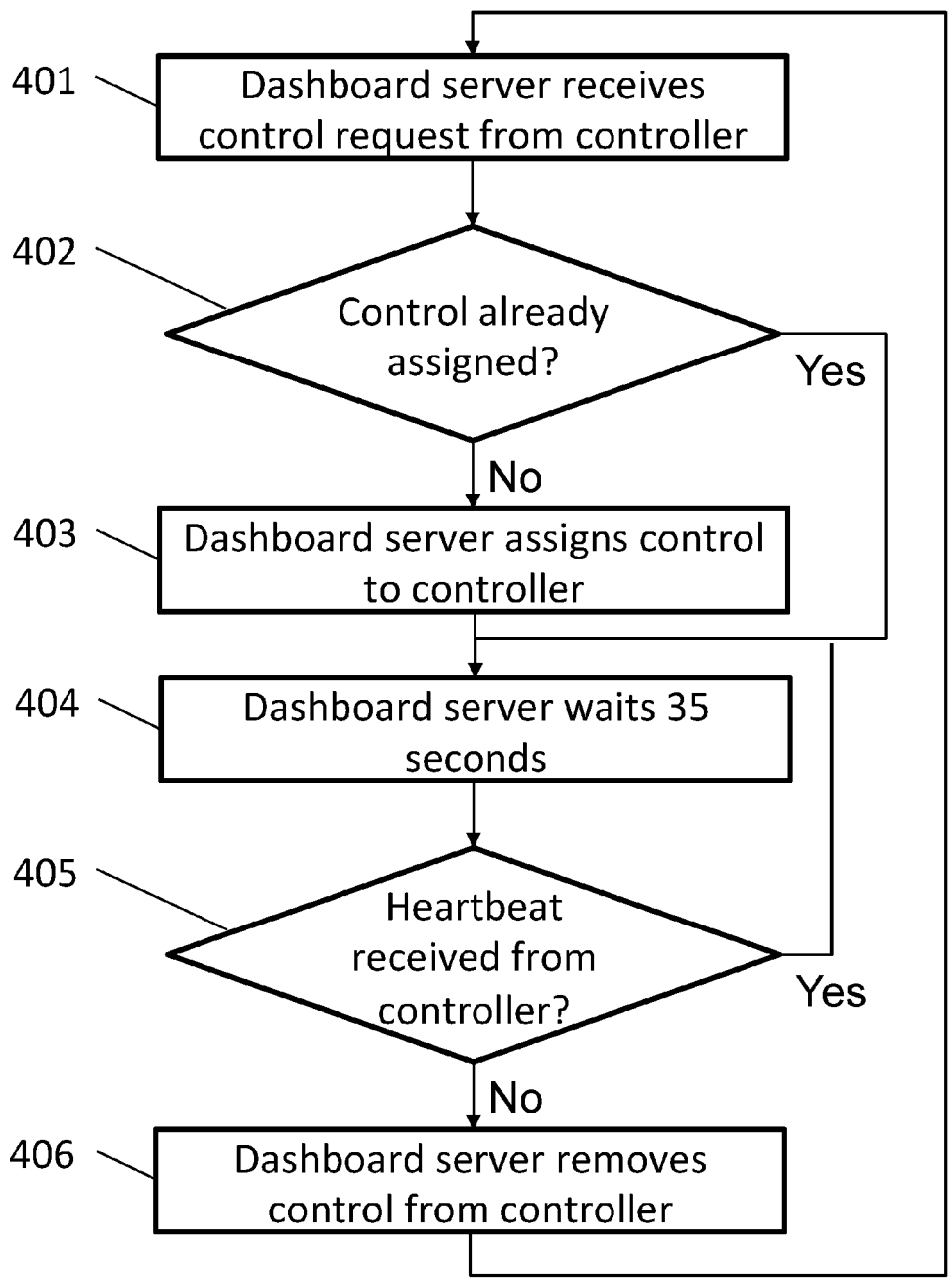

The operation of the support server 2 while the support group chat session is in progress is now described with reference to the flowchart of FIG. 2d. First, the support server 2 waits to receive a control request from a controller (step 401). If no controller has control of the group chat session (step 402), the support server 2 assigns control to the controller. Otherwise, the support server 2 passes immediately to the next step.

The support server 2 then waits 35 seconds (step 404). This is a longer period than the controllers wait between sending heartbeat messages. It will be appreciated that various other suitable time periods could be used, particularly if a different period is waited by the controllers. The support server 2 then checks if a heartbeat message has received from the controller currently in control of the group chat session (step 405). If a heartbeat message has been received, the support server 2 repeats checking every 35 seconds if a heartbeat message has been received from the controller controlling the group chat session (step 404 and subsequent steps). (In practice, the support server 2 waits 35 seconds from either assigning control to a controller or receiving a heartbeat message, so that it is always checking for a heartbeat message 5 seconds after one should have been sent.)

If, on the other hand, no heartbeat message has been received, the support server 2 removes control of the group chat session from the controller that was in control of the group chat session (step 406), and returns to waiting for a controller to request control of the group chat session (step 401 and subsequent steps).

In this way, if the support user that is in control leaves the group chat session, for example because their machine is no longer operational, the support server 2 identifies this from the lack of a heartbeat message from the support user's controller, and control is automatically passed to the controller of another support user in the group chat session.

Figure 3:
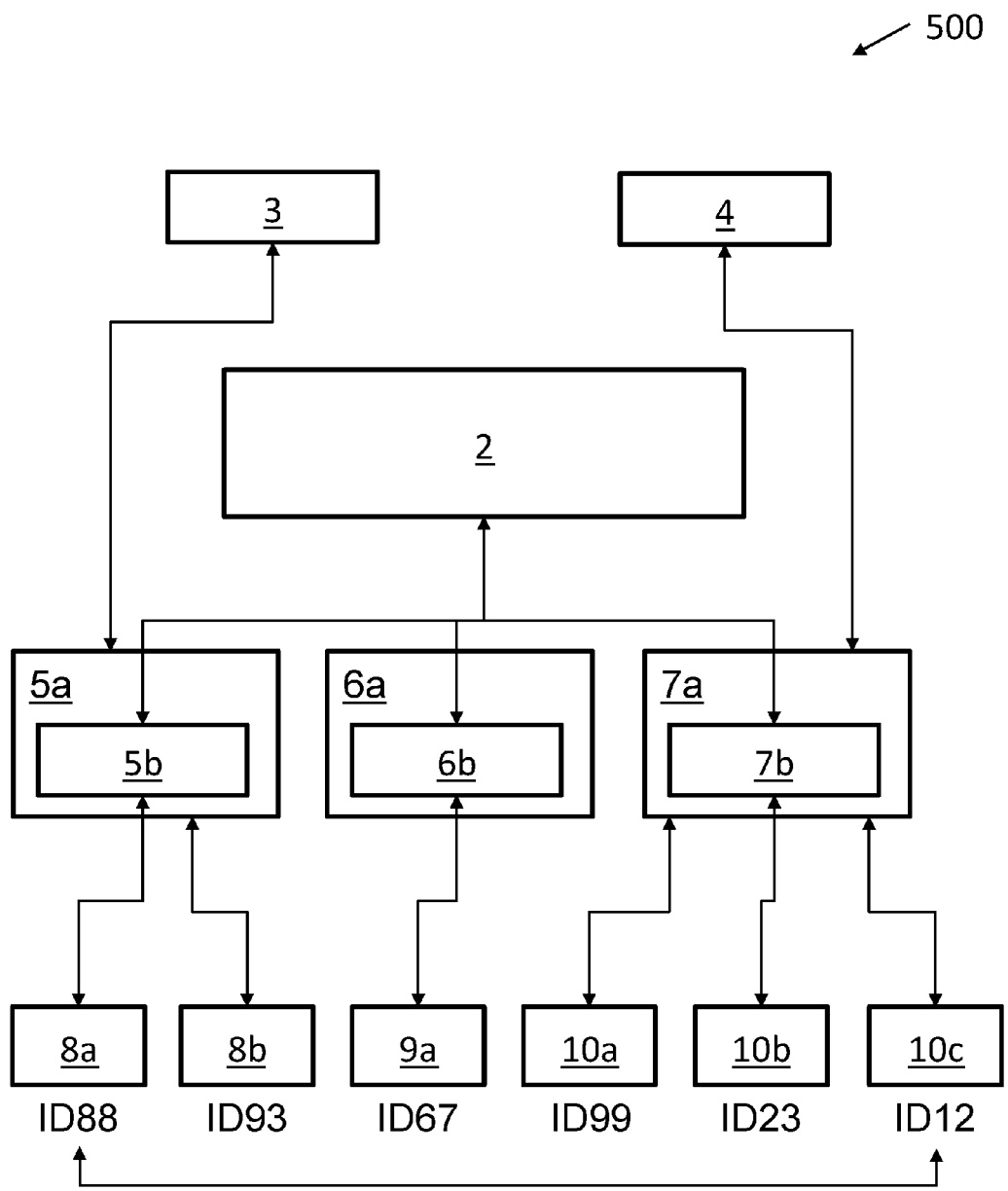
FIG. 3 is a schematic diagram showing a computer system in accordance with another embodiment of the invention.

A computer system in accordance with a second embodiment of the invention is now described with reference to FIG. 3. The computer system 500 is similar to the computer system 1 of FIG. 1. However, the support server 2 does not provide a web interface to allow communication with the support user 3 and end user 4. Rather, the support server 2 is in direct communication only with the controllers 5b, 6b and 7b. The operation of the computer system 500 is similar to the operation of the computer system 1, except that communication between the support user 3 and end user 4 is instead done via the IM applications 5a, 6a and 7a and their respective controllers 5b, 6b and 7b.

While the present invention has been described and illustrated with reference to particular embodiments, it will be appreciated by those of ordinary skill in the art that the invention lends itself to many different variations not specifically illustrated herein.

For example, while in the described embodiments the heartbeat message used by controllers to obtain the common chat ID is the same heartbeat message used by the support server to confirm that the controller in control of the group chat session is still operational, in alternative embodiments the controller could use other means to confirm that it is still operational, for example a separate heartbeat message sent directly to the support server, or any other suitable means.

It will be also appreciated that the invention is equally applicable to embodiments in which IM-type communication systems are used other than in a support environment or for the purpose of providing support. For example, in embodiments the IM-type communication system may be used for general communication between groups of end users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of operating a group chat session using a server, comprising the steps of:
   a first chat controller receiving a request from a first user to create a group chat session;
   the first chat controller creating a group chat session, including determining a first local chat ID for the group chat session associated with the first chat controller;
   the first chat controller sending the first local chat ID to the server;
   the server assigning a common chat ID to the group chat session;
   a second chat controller determining a second local chat ID for the group chat session associated with the second chat controller;
   the server receiving the second local chat ID for the group chat session associated with the second chat controller;
   the server receiving a request from the second chat controller to control the group chat session;
   the server assigning control of the group chat session to the second chat controller;
   the server receiving a request from a second user to join the group chat session;
   the server sending the request to the second chat controller using the second local chat ID;
   the second chat controller sending an invitation to the second user to join the group chat session;
   the second chat controller sending a heartbeat message to the server at predetermined intervals when in control of the group chat session; and
   the server determining if it has been more than the predetermined interval since the previous heartbeat message sent by the second chat controller, and if so removing control of the group chat session from the second chat controller.

2. A computer-implemented method as claimed in claim 1, wherein the second chat controller is the first chat controller.

3. A computer-implemented method as claimed in claim 1, wherein the second local chat ID for the group chat session associated with the second chat controller is sent to the server by the second chat controller.

4. A computer-implemented method as claimed in claim 1, further comprising the step of the second chat controller posting the common chat ID in the group chat session after receiving control of the group chat session.

5. A computer-implemented method as claimed in claim 1, further comprising the step of the second chat controller determining the common chat ID from the text of the group chat session prior to receiving control of the group chat session.

6. A computer-implemented method as claimed in claim 1, further comprising the steps, if control of the group chat session has been removed from the second chat controller, of:
   the server receiving a request from a third chat controller to control the group chat session;
   the server assigning control of the group chat session to the third chat controller.

7. A computer system for operating a group chat session, comprising:
- a server;
- a first computing device comprising an instant messaging application with a first chat controller;
- a second computing device comprising an instant messaging application with a second chat controller;
- wherein the first chat controller is arranged, in response to a first user sending a request, to create a group chat session including determining a first local chat ID for the group chat session associated with the first chat controller, and to send the first local chat ID to the server;
- wherein the second chat controller is arranged to determine a second local chat ID for the group chat session associated with the second chat controller, to send a request for control of the group chat session to the server, and in response to a request from the server to invite a second user to the group chat session, to send an invitation to the second user to join the group chat session;
- wherein the server is arranged to assign a common chat ID to the group chat session, to assign control of the group chat session to the second chat controller in response to the request for control, and in response to a request from the second user to join the group chat session, to send the request to invite the second user to the group chat session to the second chat controller;
- wherein the second chat controller is arranged to send a heartbeat message to the server at predetermined intervals when in control of the group chat session; and
- wherein the server is arranged to determine if it has been more than the predetermined interval since the previous heartbeat message sent by the second chat controller, and if so remove control of the group chat session from the second chat controller.

8. A computer system as claimed in claim 7, wherein second computing device is the first computing device, and the second chat controller is the first chat controller.

9. A computer system as claimed in claim 7, wherein second chat controller is arranged to send the second local chat ID for the group chat session associated with the second chat controller to the server.

10. A computer system as claimed in claim 7, wherein the second chat controller is arranged to post the common chat ID in the group chat session after receiving control of the group chat session.

11. A computer system as claimed in claim 7, wherein the second chat controller is arranged to determine the common chat ID from the text of the group chat session prior to receiving control of the group chat session.

12. A computer system as claimed in claim 7, wherein the server is arranged, if control of the group chat session has been removed from the second chat controller, to assign control of the group chat session to a third chat controller in response to a request from the third chat controller to control the group chat session.

13. A computer program product for operating a group chat session using a server, the computer program product comprising a non-transitory computer-readable storage medium having computer-readable program code embodied therewith, the computer-readable program code configured to perform the steps of:
- a first chat controller receiving a request from a first user to create a group chat session;
- the first chat controller creating a group chat session, including determining a first local chat ID for the group chat session associated with the first chat controller;
- the first chat controller sending the first local chat ID to the server;
- the server assigning a common chat ID to the group chat session;
- a second chat controller determining a second local chat ID for the group chat session associated with the second chat controller;
- the server receiving the second local chat ID for the group chat session associated with the second chat controller;
- the server receiving a request from the second chat controller to control the group chat session;
- the server assigning control of the group chat session to the second chat controller;
- the server receiving a request from a second user to join the group chat session;
- the server sending the request to the second chat controller using the second local chat ID;
- the second chat controller sending an invitation to the second user to join the group chat session;
- the second chat controller sending a heartbeat message to the server at predetermined intervals when in control of the group chat session; and
- the server determining if it has been more than the predetermined interval since the previous heartbeat message sent by the second chat controller, and if so removing control of the group chat session from the second chat controller.

14. A computer program product as claimed in claim 13, wherein the computer-readable program code is further configured to perform the step of the second chat controller determining the common chat ID from the text of the group chat session prior to receiving control of the group chat session.

* * * * *